H. CLARKE.
COMBINATION SEAL LOCK.
No. 6,958. Reissued Feb. 29, 1876.
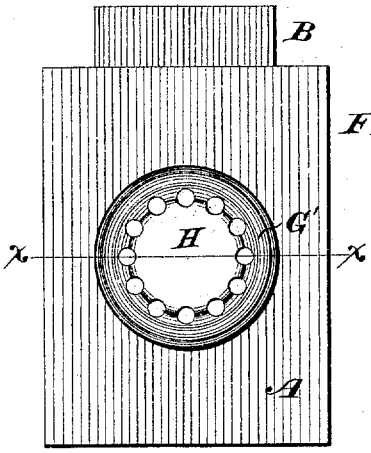
Fig 1
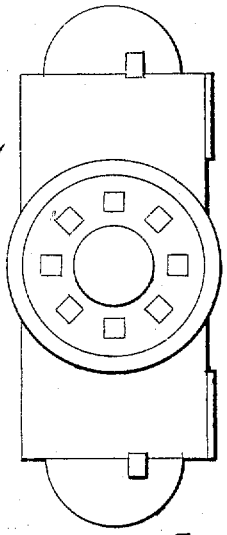
Fig 4
Fig 2
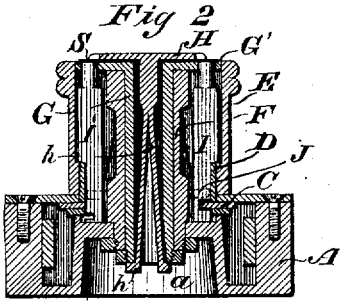
Fig 7
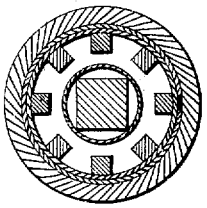
Fig 5
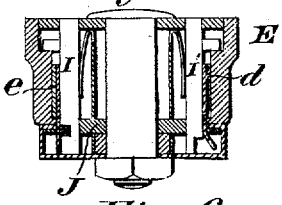
Fig 6
Fig 3.
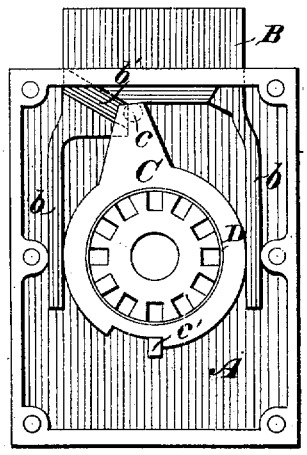
Fig 8.
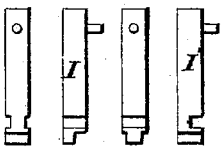
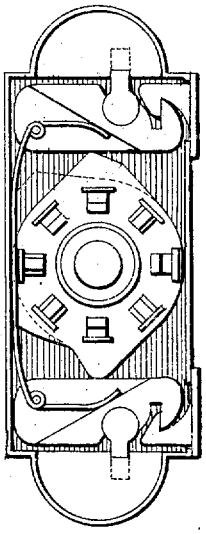
WITNESSES
Wm A Skinkle
F. Stith
INVENTOR
Henry Clarke.
By his Attorney
Wm D. Baldwin
N. PETERS, PHOTO-LITHOGRAPHER, WASHINGTON, D. C.

UNITED STATES PATENT OFFICE.

HENRY CLARKE, OF BALTIMORE, MARYLAND, ASSIGNOR TO THE CLARKE LOCK COMPANY.

IMPROVEMENT IN COMBINATION SEAL-LOCKS.

Specification forming part of Letters Patent No. 164,522, dated June 15, 1875; reissue No. 6,958, dated February 29, 1876; application filed February 14, 1876.

*To all whom it may concern:*

Be it known that I, HENRY CLARKE, of the city of Baltimore and State of Maryland, have invented new and useful Improvements in Combination-Locks, of which the following is a specification:

My present invention constitutes an improvement upon the locks shown in Letters Patent of the United States heretofore granted to me November 22, 1870, and February 4, 1873, respectively, numbered 109,386 and 135,523; and one of its primary objects is to adapt the lock to the reception of a seal, which can readily be removed or replaced, and yet which, while in place, effectually prevents access to the works of the lock.

The distinguishing characteristics of this class of locks, as shown in my former patents, are, first, a locking-plate turning on a central axis; secondly, a series of tumblers arranged around said axis, and movable endwise through notches in said locking-plate; and, thirdly, an endwise-moving sleeve, enveloping said tumblers, and acting upon them in such manner as to set them in a uniform position, from which they can be independently adjusted into proper relation with the lock-plate, to permit of its turning to actuate the bolt.

In order so to organize such a lock as to admit of the application of a seal, I make the central shaft or spindle of the lock tubular, for the reception of a locking-rod or spindle, carrying a disk at its outer end, between which disk and the face-plate of the lock, through which the tumblers work, the seal is clamped, by which means the seal can readily be applied from the outside, but can only be released from the inside of the lock.

My invention also relates to certain details of construction of the lock.

The subject-matter claimed will hereinafter specifically be pointed out.

In the accompanying drawings, Figure 1 represents an external plan view of my improved lock with its seal-holding plate in position. Fig. 2 represents a vertical central section through the lock on the line *x x* of Fig. 1. Fig. 3 represents a plan view of the lock-case with its cover removed, showing the mechanism inclosed therein.

The figures above mentioned represent a lock having a direct-moving bolt, adapted for safes, desk-drawers, and the like.

Figs. 4 to 9, inclusive, represent details of the lock, substantially similar to that shown in Letters Patent No. 135,523 of February 4, 1873, above mentioned, and adapted for application to satchels or valises.

In Figs. 1, 2, and 3 of the drawings a lock-case, A, is shown as having a central depression, *a*, for a purpose hereinafter mentioned. A bolt, B, provided with backwardly-projecting prongs *b*, moves endwise in the case, being guided and controlled by means of a diagonal slot, *b'*, in which a pin, *c*, on a turning-plate, C, traverses. The range of movement of this plate is limited by means of a stop-pin, *c'*, on the casing, abutting against the ends of a recess in the plate. This turning-plate interlocks, in a manner similar to that shown in my patent of February 4, 1873, above mentioned, with a sleeve, D, projecting through the lock-case, and capable of turning freely, but not of moving endwise therein. An ornamental band, E, fits and moves endwise freely upon this sleeve D, but is prevented from turning by means of a stop-pin, *d*, on the sleeve, traversing a groove on the band, the range of movement of which is limited by the length of this groove.

In order to prevent the projecting stop-pin from being sheared off, or being otherwise injured by the edges of the slot in which it traverses, as excessive strain is sometimes applied to the band in a circumferential direction, I sometimes use a lining, *e*, in the band, as shown in Fig. 5, and cut the slot in said lining instead of in said band itself.

In the transmission of motion from the band to the sleeve, frictional contact only between the band and its lining is depended upon, and this friction is principally caused to compensate for wear, provided by forming said lining of a diameter slightly greater than that of the inner surface of the band, which lining, after being cut, is sprung together or closed to the required diameter.

A tubular spindle, F, projecting through the lock-plate, incloses the tubular shaft G carrying a dial or face-plate, G', at its outer end. The spindle F and shaft G are each independently secured to the lock-case by nuts in the recess *a*, as shown in Fig. 2, and this recess, besides protecting the parts from injury, enables me to use a shorter shaft or spindle than would otherwise be necessary.

From an inspection of this figure, it will be obvious that the parts of the lock are held together by a tubular shaft, and can readily be removed or replaced by screwing or unscrewing said shaft. This shaft, however, if desired, may be lengthened so as to form a convenient method of fastening the lock in place.

A series of transversely-notched tumblers, I I′, are arranged concentrically around the central spindle, and move endwise and independently of each other through perforations in the dial or face plate, and in a central core or plate, J, secured upon the tubular spindle F, being pressed against the turning-sleeve by springs interposed between the sleeve and the slides or tumbler, substantially as shown and described in my patent above mentioned.

The tumblers are provided with projecting notches or shoulders, which overlap the lining of the band E, (see Fig. 2,) so that when the latter is drawn away from the lock-case the tumblers are thrust through the dial or face plate.

The details of construction, and operation of the tumblers and band are fully set forth in my patent of February 4, 1873, and need not be recapitulated here.

The seal-holding device hereinbefore mentioned consists of a plate, H, of a diameter about equal to the distance between the centers of two opposite tumblers, and having its edges notched or indented to permit of their passing through it. This plate is secured in place by a rod or split spring-pin, *h*, having locking-studs on its bottom, which are forced outward by the spring when they pass beyond the inner end of the tubular shaft G, and interlocking with it at the back of the lock.

The paper or composition seal S, interposed between the face-plate and the seal-plate, covers the outer end of the tumblers, and consequently prevents access to or tampering with them, as the withdrawal of the band will cause the tumblers to perforate or cut the seal.

My lock, being keyless, of course obviates the annoyance of the loss of keys, and the liability of tampering with the tumblers through a key-hole.

I claim as of my own invention—

1. The combination, substantially as hereinbefore set forth, of a dial or perforated face-plate, tumblers moving endwise through said face-plate, and a seal-plate, between which and the face-plate the seal is interposed to cover and prevent access to the tumblers.

2. The combination, substantially as hereinbefore set forth, of a tubular shaft, a dial or face-plate mounted thereon, tumblers moving endwise through said plate, and a seal-plate secured upon a locking-rod passing through said tubular shaft.

3. The combination, substantially as hereinbefore set forth, of a tubular spindle, endwise-moving tumblers surrounding said spindle, and a sea-plate through which the tumblers work.

4. The combination, substantially as hereinbefore set forth, of a tubular shaft carrying a dial or face-plate, endwise-moving tumblers, an enveloping-band, and a self-locking seal-plate.

5. The combination, substantially as hereinbefore set forth, of a lock-case, a central tubular sleeve, endwise-moving tumblers, an enveloping-band, and a self-locking seal-plate, whereby the parts may be removed and replaced by unfastening a central dial-shaft.

6. The combination, substantially as hereinbefore set forth, in a keyless combination-lock, of endwise-moving tumblers, a removable self-locking endwise-moving seal-plate, and a seal interposed between said plate and the ends of the tumblers, for the purpose specified.

7. The combination, substantially as hereinbefore set forth, of a turning-sleeve, its stop, endwise-moving band and its slotted compensating lining.

8. The combination, substantially as hereinbefore set forth, of the recessed lock-case, and the tubular dial-shaft, which holds the lock-case and dial together.

9. The combination seal-lock hereinbefore described, consisting of the combination of the case, slide-bolt, a turning-plate actuating said bolt, a central tubular spindle or dial-bolt, a self-locking seal-plate, endwise-moving tumblers, and an endwise-moving tubular band.

HENRY CLARKE.

Witnesses:
E. C. DAVIDSON,
WM. J. PEYTON.